US012174575B2

(12) United States Patent
Shuhama et al.

(10) Patent No.: US 12,174,575 B2
(45) Date of Patent: Dec. 24, 2024

(54) IMAGE FORMING APPARATUS

(71) Applicant: CANON KABUSHIKI KAISHA, Tokyo (JP)

(72) Inventors: Yu Shuhama, Yokohama (JP); Satoru Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/359,784

(22) Filed: Jul. 26, 2023

(65) Prior Publication Data

US 2023/0384729 A1 Nov. 30, 2023

Related U.S. Application Data

(63) Continuation of application No. 17/856,501, filed on Jul. 1, 2022, now Pat. No. 11,754,962, which is a continuation of application No. 17/230,688, filed on Apr. 14, 2021, now Pat. No. 11,392,073, which is a continuation of application No. 16/831,440, filed on Mar. 26, 2020, now abandoned.

(30) Foreign Application Priority Data

Mar. 29, 2019 (JP) ................................ 2019-068047

(51) Int. Cl.
*G03G 15/00* (2006.01)

(52) U.S. Cl.
CPC .................................. *G03G 15/80* (2013.01)

(58) Field of Classification Search
CPC ............... G03G 15/80; G03G 21/1647; G03G 21/1652; G03G 21/1619
See application file for complete search history.

(56) References Cited

U.S. PATENT DOCUMENTS 11,754,962 B2* 9/2023 Shuhama ............... G03G 15/80 399/88
2005/0073820 A1* 4/2005 Lim ..................... H05K 7/1422 361/784
2005/0095017 A1* 5/2005 Kikuchi ............. G03G 15/0863 399/12
2015/0282368 A1* 10/2015 Shiohara .................. B41J 29/13 361/796
2016/0109845 A1* 4/2016 Ohata .................... G03G 15/80 399/90

(Continued)

*Primary Examiner* — Sandra Brase
(74) *Attorney, Agent, or Firm* — Canon U.S.A., Inc. IP Division

(57) ABSTRACT

An image forming apparatus includes an image forming unit configured to form an image on a recoding medium, side plates extending on one end and another end of the image forming unit in a vertical direction thereof and configured to support the image forming unit, a main board including an element on a first board and fixed to the side plate on the one end such that the first board vertically extends on an outer side of the side plate, a sub-board including an element on a second board and electrically connected to the main board, a top surface member arranged above the image forming unit and including a sheet discharge tray, and a holding member configured to support the sub-board below the top surface member such that the second board extends in a direction intersecting with a plane on which the first board of the main board extends.

21 Claims, 6 Drawing Sheets

(56) References Cited

U.S. PATENT DOCUMENTS

| | | | | |
|---|---|---|---|---|
| 2016/0187834 | A1* | 6/2016 | Matsuno | G03G 21/1652 399/92 |
| 2016/0246241 | A1* | 8/2016 | Kakutani | G03G 21/1652 |
| 2017/0090416 | A1* | 3/2017 | Arata | G03G 21/1619 |
| 2017/0322509 | A1* | 11/2017 | Matsuno | G03G 15/80 |

* cited by examiner

IMAGE FORMING APPARATUS

CROSS-REFERENCE TO RELATED APPLICATIONS

The present application is a continuation of U.S. patent application Ser. No. 17/856,501, filed on Jul. 1, 2022, which is a continuation of U.S. patent application Ser. No. 17/230,688, filed on Apr. 14, 2021, and issued as U.S. Pat. No. 11,392,073 on Jul. 19, 2022, which is a continuation of U.S. patent application Ser. No. 16/831,440, filed on Mar. 26, 2020, which claims priority from Japanese Patent Application No. 2019-068047 filed Mar. 29, 2019, all of which are hereby incorporated by reference herein in their entireties.

BACKGROUND

Field of the Disclosure

The present disclosure relates to an image forming apparatus such as a copier and a printer that forms an image on a recording medium.

Description of the Related Art

In recent years, an image forming apparatus such as a laser beam printer has been expected to be multifunctional to meet various user needs. For example, in communication with an information processing apparatus such as a computer, wireless communication is demanded in addition to wired connection. In a conventional image forming apparatus that employs a wireless communication technology, a configuration is used in which an expansion board with a wireless communication antenna or a wireless communication circuit is connected to a video controller board (an interface board) having an external connection interface function (Japanese Patent Application Laid-Open No. 2006-56017).

SUMMARY OF THE DISCLOSURE

In recent years, an image forming apparatus such as a laser beam printer has been expected to be smaller in size in addition to the demand for it to be multifunctional. If a video controller board and an expansion board are arranged so as not to overlap and are connected via a connecter cable as in the conventional configuration, an increase in size of space in which a board is to be arranged is unavoidable. This has hindered reduction in size of the image forming apparatus.

The present disclosure is directed to an image forming apparatus that can prevent an increase in size thereof even in a case where a sub-board that expands or complements a function of a main board is connected to the main board.

According to an aspect of the present disclosure, an image forming apparatus includes an image forming unit configured to form an image on a recoding medium, side plates arranged on one end and another end of the image forming unit to extend in a vertical direction thereof and configured to support the image forming unit, a main board that is an electronic circuit board including an element on a first board and is fixed to the side plate on the one end such that the first board extends in the vertical direction on an outer side of the side plate, a sub-board that is an electronic circuit board including an element on a second board and is electrically connected to the main board, a top surface member arranged above the image forming unit and including a sheet discharge tray on which a recording medium with an image formed by the image forming unit is to be discharged, and a holding member configured to support the sub-board below the top surface member such that the second board extends in a direction intersecting with a plane on which the first board of the main board extends.

Further features of the present disclosure will become apparent from the following description of exemplary embodiments with reference to the attached drawings.

DESCRIPTION OF THE EMBODIMENTS

A first exemplary embodiment will be described. An image forming apparatus 1 according to the first exemplary embodiment is an electrophotographic laser beam printer that performs recording by emitting a laser beam to a photosensitive member.

Figure 1:
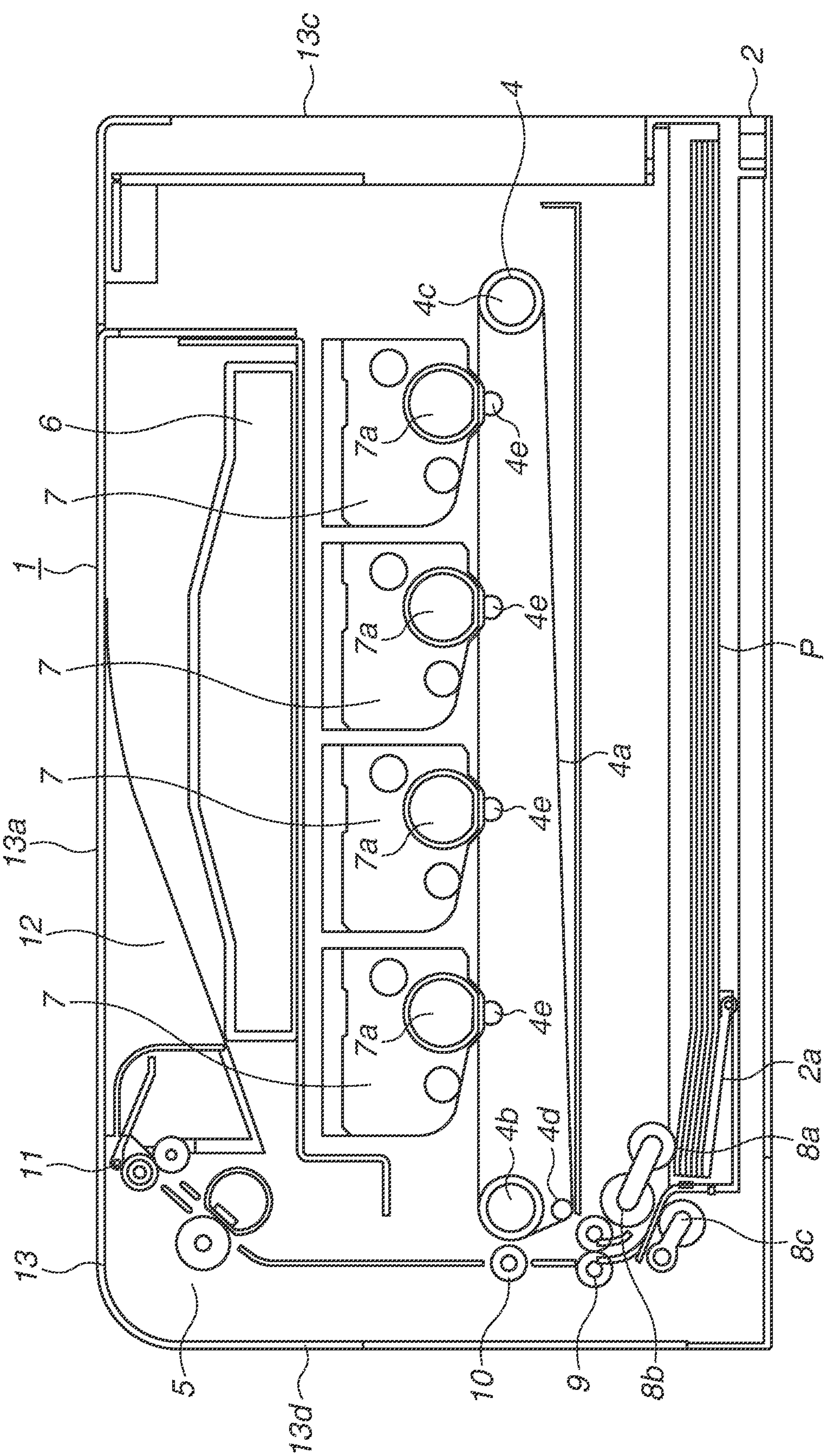
FIG. 1 is a schematic sectional view illustrating an image forming apparatus according to a first exemplary embodiment.

FIG. 1 is a sectional view of a main mechanical unit of the image forming apparatus 1 according to the first exemplary embodiment.

(Overall Configuration of Image Forming Apparatus)

In FIG. 1, the image forming apparatus 1 includes a sheet feeding cassette 2 as a recording medium storage unit in which recording sheets P as recording media to be fed to the image forming apparatus 1 are stored. A sheet feeding roller 8*a* as a sheet feeding portion is arranged in an upper front end of the sheet feeding cassette 2 in an apparatus body, and a pressurizing plate 2*a* as a pressing member is arranged under the stacked recording sheets P. The recording sheets P stored in the sheet feeding cassette 2 are pressed by the sheet feeding roller 8*a* and the pressurizing plate 2*a*, and are then picked up. The recording sheets P stacked in the sheet feeding cassette 2 are separated one by one by a sheet feeding roller 8*b* and a separation mechanism 8*c*, and each separated recording sheet P is fed to a registration roller pair 9. The registration roller pair 9 is arranged in a conveyance path to convey the recording sheet P fed by the sheet feeding roller 8*b* to an image forming unit.

The image forming unit includes a plurality of process cartridges 7, a laser scanner (a light irradiation unit) 6, an intermediate transfer unit 4, and a secondary transfer roller 10. In the present exemplary embodiment, the plurality of process cartridges 7 is arranged for respective four colors of yellow, magenta, cyan and black. The plurality of process cartridges 7 only differs from each other in color of toner (developer) stored therein but has the same configuration. Each of the plurality of process cartridges 7 includes a developing device, a cleaner, a charging roller, toner that are not illustrated, and a photosensitive drum 7*a*. The intermediate transfer unit 4 includes the secondary transfer roller 10, an intermediate transfer belt 4*a* as an endless belt that rotationally moves, a counter roller 4*b*, a driven roller 4*c*, and a drive roller 4*d*. The counter roller 4*b*, the driven roller 4*c*, and the drive roller 4*d* are arranged on an inner peripheral surface of the intermediate transfer belt 4*a*. The intermediate transfer belt 4*a* is stretched by the counter roller 4*b* and the driven roller 4*c*, and the drive roller 4*d* applies certain tension to the intermediate transfer belt 4*a* so as to transmit a driving force. A plurality of primary transfer rollers 4*e* is arranged opposite the respective photosensitive drums 7*a* via the intermediate transfer belt 4*a*. The secondary transfer roller 10 is arranged opposite the counter roller 4*b* via the intermediate transfer belt 4*a*.

In each of the process cartridges 7, the charging roller charges a surface of the photosensitive drum 7*a*, and the laser scanner 6 emits a laser beam corresponding to image information to the photosensitive drum 7*a* to form a latent image. Then, in each of the process cartridges 7, the developing device develops the latent image, thereby forming a toner image on the surface of the photosensitive drum 7*a*. In such a manner, toner images of yellow, magenta, cyan, and black are formed on the photosensitive drums 7*a* in the respective process cartridges 7. When voltages are applied to the primary transfer rollers 4*e*, the toner images are sequentially transferred to the intermediate transfer belt 4*a* in respective primary transfer portions between the photosensitive drums 7*a* and the primary transfer rollers 4*e*. Then, each of the toner images is superimposed on the intermediate transfer belt 4*a*, thereby forming a color toner image on the intermediate transfer belt 4*a*. The color toner image transferred to the intermediate transfer belt 4*a* is secondarily transferred to a recording sheet P supplied by the registration roller pair 9 at a timing when the color toner image enters a nip portion between the secondary transfer roller 10 and the counter roller 4*b*. The toner image transferred to the recording sheet P in the image forming unit is conveyed to a fixing device 5. In the fixing device 5, the toner image is fixed on the conveyed recording sheet P with heat. Then, a discharge roller pair 11 discharges the recording sheet P with the toner image fixed thereon to a sheet discharge tray 12 arranged on an upper surface of the image forming apparatus 1.

(Frame Configuration of Image Forming Apparatus)

Figure 2:
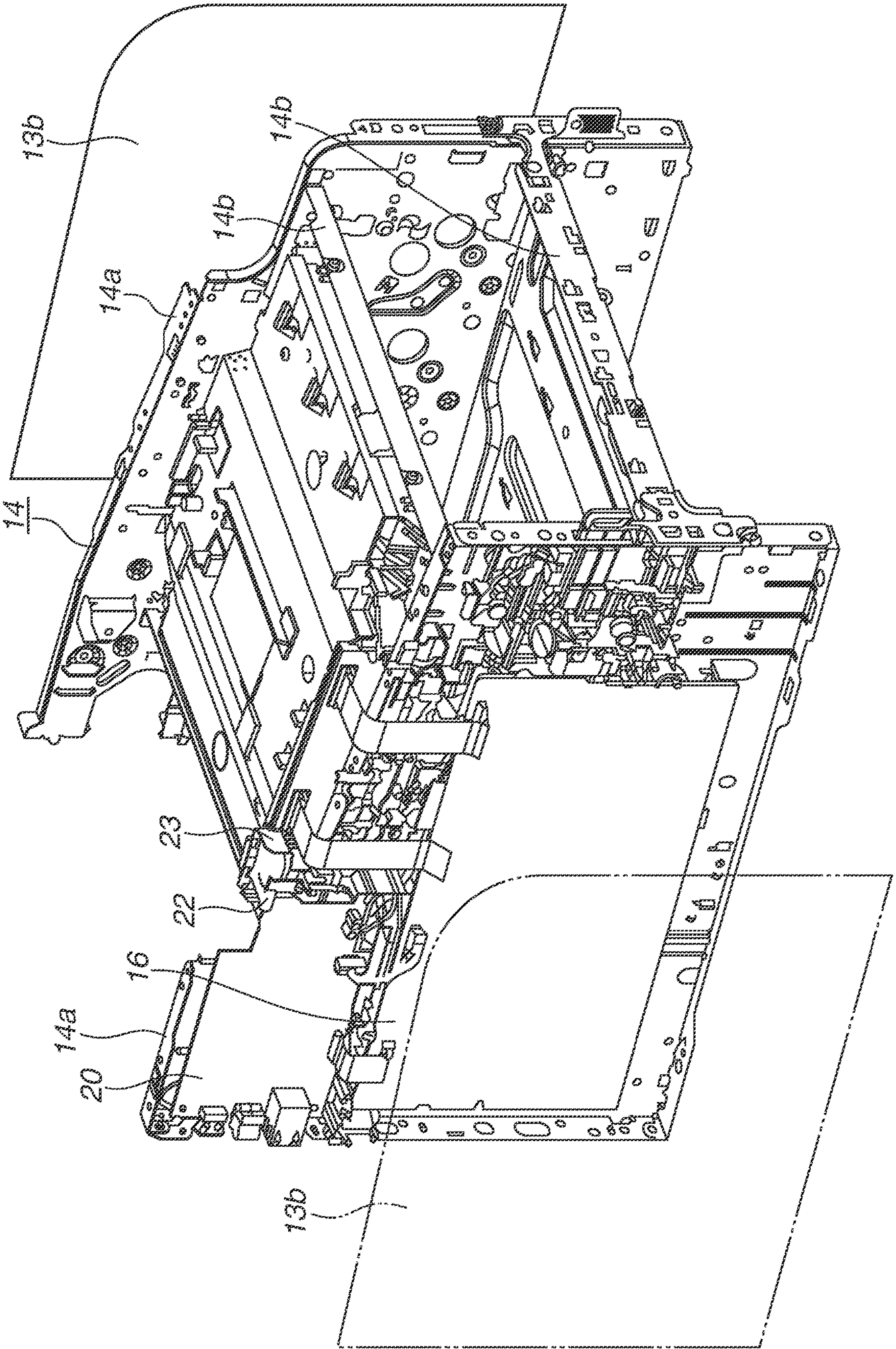
FIG. 2 is a perspective view illustrating a configuration of the image forming apparatus according to the first exemplary embodiment.

A basic structure of the image forming apparatus 1 includes side plates 14*a* and a plurality of stays 14*b* as connecting members as illustrated in FIG. 2. As illustrated in FIG. 2, the side plates 14*a* are extending in a vertical direction and arranged on both sides of the image forming unit configured to form an image on a recording sheet P. Each of the stays 14*b* is arranged in a horizontal direction between the side plates 14*a* to connect the side plates 14*a*. The side plates 14*a* are arranged opposite each other with the sheet feeding cassette 2, the process cartridge 7, the fixing device 5, and the sheet discharge tray 12 therebetween. The side plates 14*a* and the plurality of stays 14*b* are members formed of plate-shaped members made of metal. A structure formed by the side plates 14*a* and the stays 14*b* functions as a frame 14 of the image forming apparatus 1, and members inside the image forming apparatus 1 are supported by the frame 14. An exterior member 13 (FIG. 1) made of resin is fixed to the frame 14, so that the image forming apparatus 1 is formed.

The exterior member 13 includes a top surface member 13*a*, a side surface member 13*b* (FIG. 1), a front surface member 13*c*, and a back surface member 13*d*. The top surface member 13*a* includes the sheet discharge tray 12 having a recess shape, and is arranged vertically above the image forming unit. The side surface members 13*b* are fixed to the side plates 14*a* arranged on the both sides of the frame 14. Each of the side surface members 13*b* is arranged on an outer side of the side plate 14*a* relative to the apparatus. The front surface member 13*c* is arranged on an apparatus front surface, and a portion thereof is opened and closed. The back surface member 13*d* is arranged on an apparatus back surface.

(Arrangement of Interface Board)

The image forming apparatus 1 includes various electronic circuit boards having elements arranged on boards. Since the electronic circuit board cannot be arranged in a position in which the electronic circuit board interferes with components such as the sheet feeding cassette 2, the process cartridges 7, and the fixing device 5 arranged between the side plates 14*a*, the electronic circuit board is arranged such that the board extends in the vertical direction between the side plate 14*a* and the side surface member 13*b*. For example, as illustrated in FIG. 2, the image forming apparatus 1 includes an interface board 20 (a main board) to which information is input from an external information device such as a host computer. The interface board 20 includes a basic input-output terminal such as a universal serial bus (USB) port and a local area network (LAN) port. Since the input-output terminal is arranged on the apparatus back surface, the interface board 20 needs to be arranged on the apparatus back surface. Accordingly, a location where the interface board 20 can be arranged is limited in the image forming apparatus 1.

Meanwhile, an extension board 22 (a sub-board) can be connected to the interface board 20 so that the interface board 20 can accommodate other functions in addition to a function of the interface board 20 itself. The term "other functions" used herein includes a communication function compliant with a communication method such as a wireless fidelity (Wi-Fi) method and a near field communication (NFC) method, and a backup function of storing an operation state of the apparatus body even in a case where the interface board 20 is replaced. Consequently, in a case where the extension board 22 for extending a function is to be connected, a space in which the extension board 22 is to be arranged becomes necessary in addition to a space for the interface board 20. This hinders reduction in size of the image forming apparatus.

Figure 3:
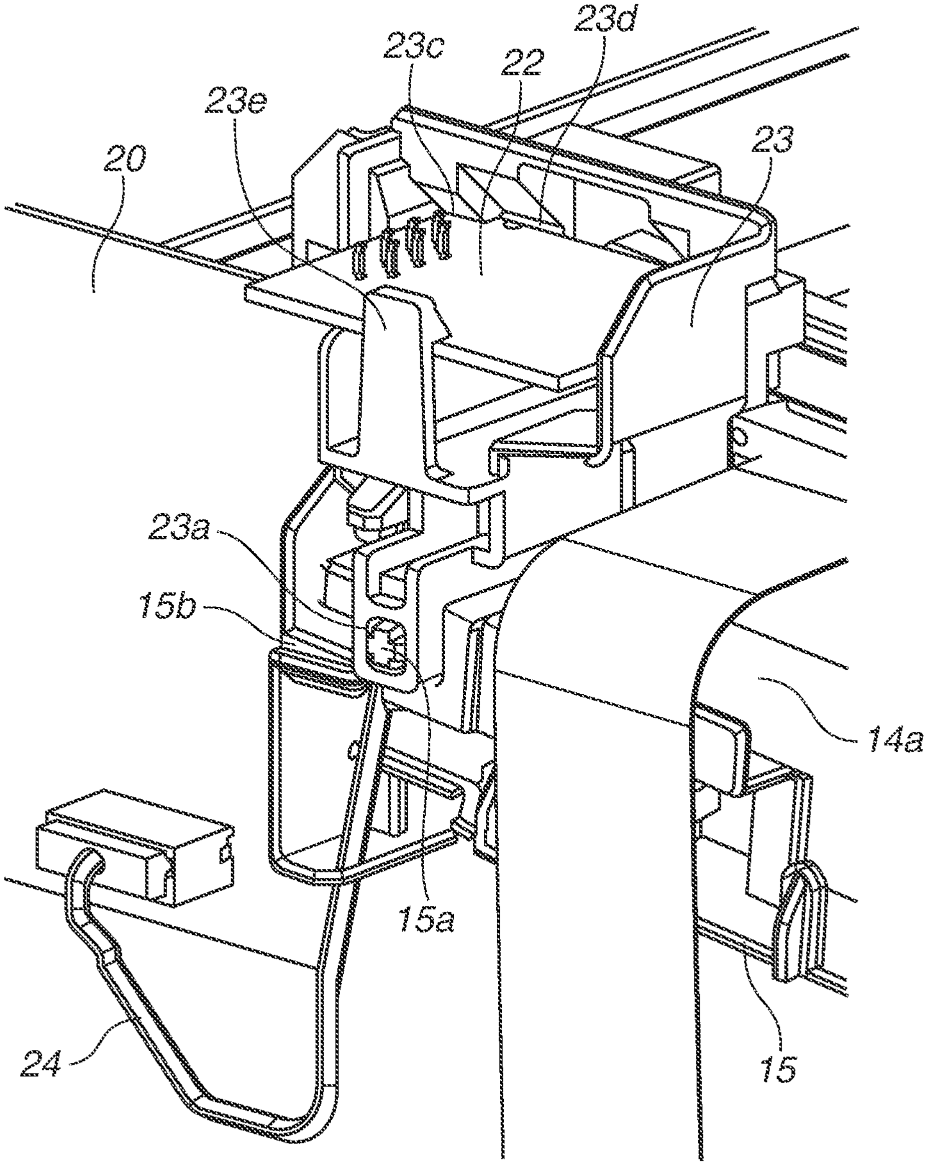
FIG. 3 is a perspective view illustrating a holding member in the image forming apparatus according to the first exemplary embodiment.
Figure 4:
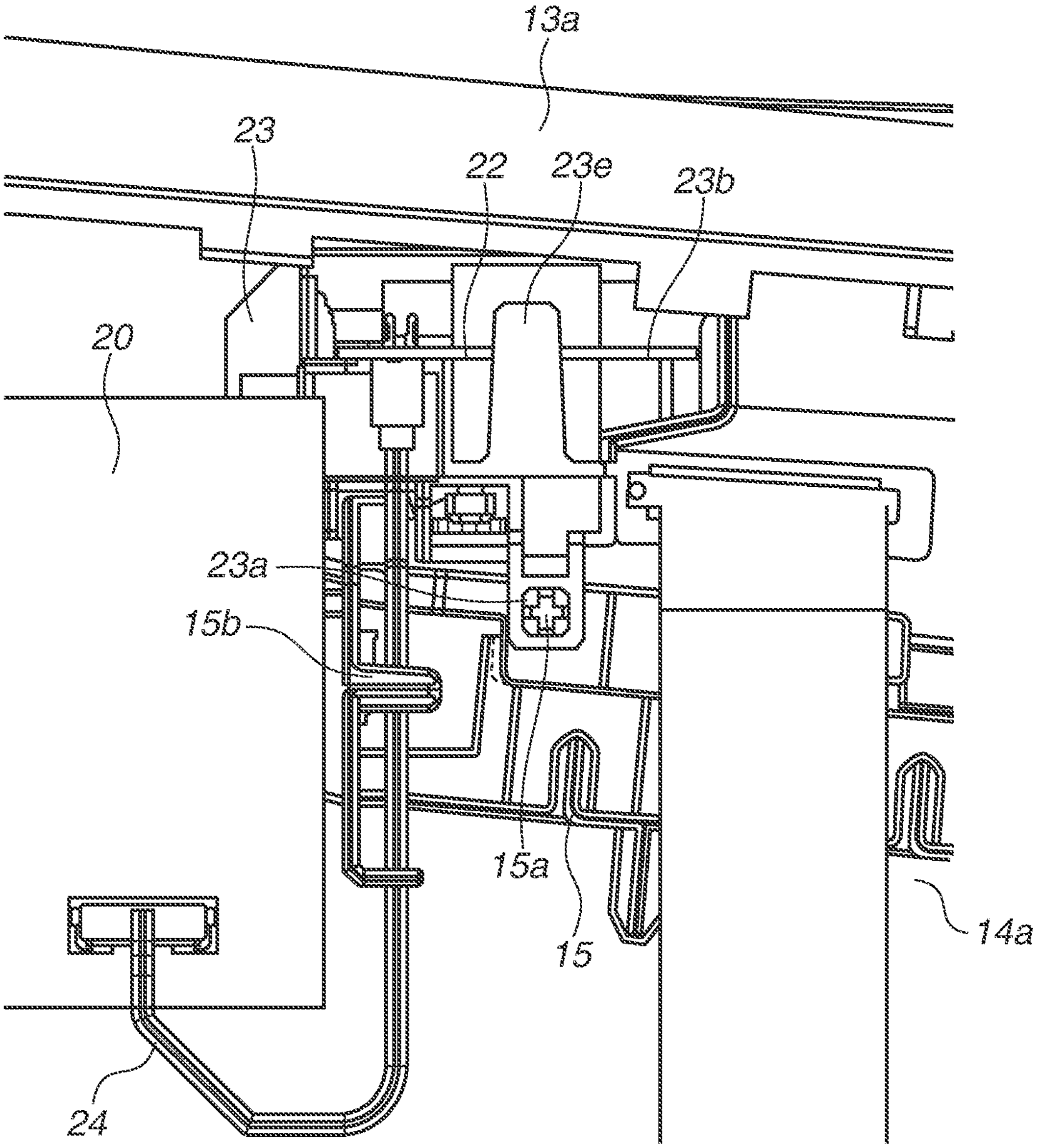
FIG. 4 is a schematic sectional view illustrating the holding member according to the first exemplary embodiment.

In the present exemplary embodiment, as illustrated in FIGS. 3 and 4, a holding member 23 is used to support the extension board 22 such that a board (a second board) of the extension board 22 extends in a direction intersecting with a board (a first board) of the interface board 20. In other words, the extension board 22 is arranged such that the board of the extension board 22 extends in the horizontal direction vertically below the top surface member 13*a*, more specifically, vertically below the sheet discharge tray 12.

The holding member 23 is fixed via a resin-made supporting member 15 fixed to the side plate 14*a*. The supporting member 15 incudes a protruding portion 15*a* and an engaging portion (not illustrated) having a through hole. The protruding portion 15*a* protrudes outward in a vertical manner from the side plate 14*a* so as to be away from the side plate 14*a*. The holding member 23 includes an opening portion 23*a* and a snap-fit portion 23*e*. The protruding portion 15*a* of the supporting member 15 is inserted into the opening portion 23*a* of the holding member 23 and, at the same time, the snap-fit portion of the holding member 23 is engaged with the engaging portion of the supporting member 15, so that the holding member 23 is fixed to the supporting member 15. In this manner, the holding member 23 can be simply fixed by being inserted into the supporting member 15 toward a direction perpendicular to the side plate 14*a*.

The extension board 22 is rotated about one end of a board surface, so that the extension board 22 is fixed to the holding member 23. The holding member 23 includes a supporting surface 23*b* that supports the extension board 22. Moreover, the holding member 23 includes a regulation portion 23*c* and a snap-fit portion 23*e* that respectively correspond to one side and the other side of opposite sides of the extension board 22. The regulation portion 23*c* causes the extension board 22 to be positioned between the supporting surface 23*b* and the regulation portion 23*c* to prevent an upward movement of the extension board 22. More particularly, the regulation portion 23*c* is a portion that is formed to protrude through a portion of the extension board 22 from a wall surface 23*d* facing one of the sides of the extension board 22. Accordingly, one end of the extension board 22 contacts the wall surface 23*d* between the regulation portion 23*c* and the supporting surface 23*b*, and the extension board 22 is rotated about such a contact portion. Thus, the extension board 22 contacts, distorts and pushes the snap-fit portion 23*e*, and then is inserted into the holding member 23. As a result, an upward movement of the extension board 22 inserted into the holding member 23 is regulated at one end by the regulation portion 23*c* and the other end by the snap-fit portion 23*e* while the extension board 22 is being supported by the supporting surface 23*b*. Moreover, in a direction in which the board surface of the extension board 22 extends, a movement of the extension board 22 inserted into the holding member 23 toward a direction in which the regulation portion 23*c* and the snap-fit portion 23*e* are opposite is regulated. In the present exemplary embodiment, in addition to the wall surface 23*d* and the snap-fit portion 23*e* which are arranged so as to be opposite to correspond to the opposite sides of the extension board 22, wall surfaces are arranged so as to correspond to the other opposite sides of the extension board 22. Accordingly, in a direction in which the board surface of the extension board 22 extends, a movement of the extension board 22 inserted into the holding member 23 toward a direction intersecting with the direction in which the regulation portion 23*c* and the snap-fit portion 23*e* are opposite is regulated.

(Connection of Interface Board to Expansion Board)

The extension board 22 and the interface board 20 are electrically connected via a connector wiring 24. The connector wiring 24 has a configuration in which male connectors are attached to both ends of wiring. The male connector at one end of the connector wiring 24 is connected to a female connector of the extension board 22, whereas the male connector at the other end of the connector wiring 24 is connected to a female connector of the interface board 20. Thus, two boards, the extension board 22 and the interface board 20, are connected to the connector wiring 24. In the present exemplary embodiment, the wiring of the connector wiring 24 passes a predetermined position by a guide portion 15*b* of the supporting member 15.

(Description of Effect)

The configuration as described above can prevent an increase in size of the image forming apparatus 1 in comparison with a case in which a board surface of the extension board 22 and a board surface of the interface board 20 are arranged on a same plane. In a case where the extension board 22 is arranged on the side plate 14*a*, a space for the extension board 22 is difficult to obtain due to the interface board 20 and a power source board 16 arranged thereon. Even in a case where the extension board 22 is arranged thereon, the degree of structural flexibility is low. However, in the present exemplary embodiment, the extension board 22 is arranged so as to intersect with the interface board 20, thereby enhancing the degree of structural flexibility. Accordingly, in a case where a backup member including a battery and a storage element that stores an operation state of the apparatus is to be arranged with the extension board 22, the connector wiring 24 can be arranged in a position where the connector wiring 24 is not necessarily extended. Meanwhile, in a case where a communication board that allows for a communication method such as a Wi-Fi method and an NFC method is to be arranged with the extension board 22, a wireless communication antenna portion included in the communication board is arranged vertically below the sheet discharge tray 12. Hence, electric waves to be transmitted and received can be prevented from being blocked by the side plates 14*a* made of metal. Alternatively, the wireless communication antenna portion included in the communication board may be arranged away from a motor (not illustrated) as a drive source or the power source board 16 that can be a noise source, so that good reception can be obtained.

The protruding portion 15*a* of the supporting member 15 is inserted into the opening portion 23*a* of the holding member 23 in a state in which the holding member 23 is holding the extension board 22. At the same time, a snap-fit portion (not illustrated) of the holding member 23 is engaged with an engaging portion of the supporting member 15. Thus, the holding member 23 is fixed to the supporting member 15. In such a manner, the holding member 23 is inserted into the supporting member 15 in a direction perpendicular to the side plate 14*a*, so that the holding member 23 can be simply fixed. Moreover, the insertion of the holding member 23 into the supporting member 15 in the direction perpendicular to the side plate 14*a* allows the holding member 23 to be detachable. Thus, by removing the side surface member 13*b* fixed to the side plate 14*a*, the extension board 22 held by the holding member 23 can be detached, for example, without removal of the top surface member 13*a*.

Modification Example

In the first exemplary embodiment, the supporting member 15 and the holding member 23 respectively include the protruding portion 15*a* and the opening portion 23*a*, and the opening portion 23*a* of the holding member 23 is guided by the protruding portion 15*a* of the supporting member 15 such that the holding member 23 is inserted in a certain direction. However, the holding member 23 can be directly fixed to the side plate 14*a* without the supporting member 15. The supporting member 15 and the holding member 23 may not respectively include the protruding portion 15*a* and the opening portion 23*a*.

Figure 5:
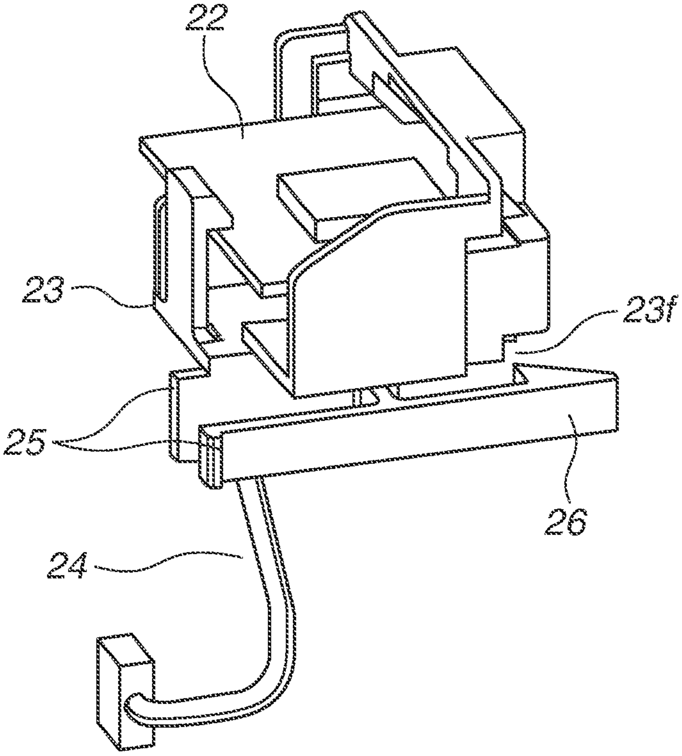
FIG. 5 is a perspective view illustrating a holding member to be used in an image forming apparatus according to a modification example.
Figure 6:
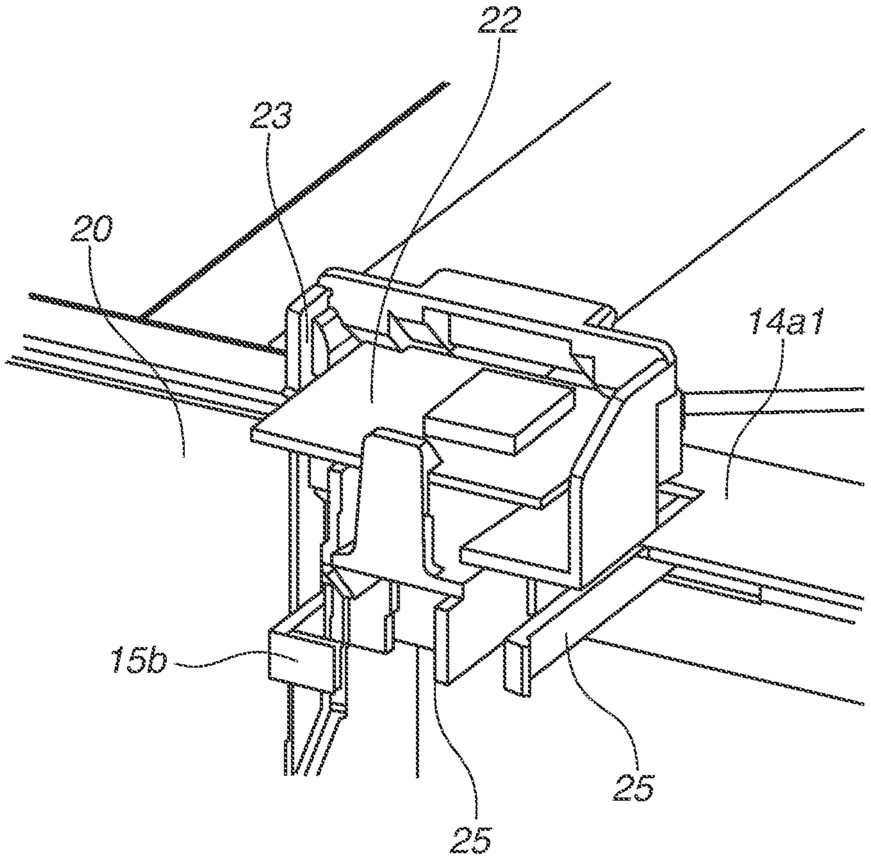
FIG. 6 is a perspective view illustrating the holding member in the image forming apparatus according to the modification example.

In a modification example of the exemplary embodiment, as illustrated in FIGS. 5 and 6, a bending surface 14*al* is formed on a side plate 14*a* to be bent and protrude outward, and a groove portion 23*f* is formed in a holding member 23 to nip and hold the bending surface 14*al* so that a vertical movement of the holding member 23 is regulated thereby. Moreover, the holding member 23 includes two snap-fit portions 25 in positions facing each other. The two snap-fit portions 25 include respective claw portions 26 on surfaces facing each other. The claw portions 26 includes a guiding surface and a step portion respectively. The two snap-fit portions 25 hold the side plate 14*a* therebetween so that a movement of the apparatus in a front-back direction is regulated, and at the same time the holding member 23 is prevented from being displaced from the side plate 14*a* by the claw portions 26. Particularly, in the present modification example, the snap-fit portion 25 is displaced to be separated from an engaging portion of the side plate 14*a* by applying a force on an opposite end of the end on which the claw portion 26 of the snap-fit portion 25 is formed, thereby releasing the claw portion 26 and the side plate 14*a*.

In the present modification example, not only an effect similar to the first exemplary embodiment can be obtained, but also the holding member 23 holding the extension board 22 can be readily removed. Moreover, various changes can be made within the scope of the present disclosure. For example, the configuration in which the bending surface 14*a*1 of the side plate 14*a* is nipped and held by the groove portion 23*f* of the holding member 23 according to the present modification example is added to the configuration of the first exemplary embodiment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:
- an image forming unit configured to form an image on a recoding medium;
- a top surface member arranged above the image forming unit and including a discharge tray onto which a recording medium with an image formed by the image forming unit is to be discharged;
- a frame including
  - a first side plate configured to support the image forming unit, the first side plate extending in a first direction; and
  - a second side plate configured to support the image forming unit, wherein the second side plate is opposite to the first side plate in a second direction so that the discharge tray is arranged between the first side plate and the second side plate;
- a first electronic circuit board supported by the first side plate;
- a second electronic circuit board electrically connected to the first electronic circuit board, wherein the second electronic circuit board extends on a plane intersecting with a plane on which the first electronic circuit board extends;
- a supporting member attached to the first side plate; and
- a holding member configured to support the second electronic circuit board, the holding member being attached to the supporting member so that an engagement portion is formed,
- wherein, in the second direction, a distance between the second electronic circuit board and the first side plate is shorter than a distance between the second side plate and the first side plate, and
- wherein the engagement portion includes a projection projecting toward a direction crossing to the first direction and a hole into which the projection is inserted.

2. The image forming apparatus according to claim 1, wherein the second electronic circuit board is located below the top surface member.

3. The image forming apparatus according to claim 2, wherein the second electronic circuit board includes a battery and a storage.

4. The image forming apparatus according to claim 2, wherein the second electronic circuit board includes a wireless communication antenna.

5. The image forming apparatus according to claim 1, wherein the holding member includes a snap fit portion, and the snap fit portion is configured to engage the second electronic circuit board.

6. The image forming apparatus according to claim 5, wherein at least part of the snap fit portion is arranged above the second electronic circuit board.

7. The image forming apparatus according to claim 5, wherein the second electronic circuit board is arranged between the snap fit portion and the first side plate.

8. The image forming apparatus according to claim 1, wherein the second electronic circuit board includes a battery and a storage.

9. The image forming apparatus according to claim 1, wherein the second electronic circuit board includes a wireless communication antenna.

10. The image forming apparatus according to claim 1, wherein the second electronic circuit board includes a first board end and a second board end opposite to the first board end in the second direction, and
- wherein, in the second direction, a distance between the first board end and the second side plate is shorter than the second board end and the second side plate, and the distance between the second board end and the second side plate is longer than a distance between the first electronic circuit board and the second side plate.

11. The image forming apparatus according to claim 10, wherein the second electronic circuit board includes a battery and a storage.

12. The image forming apparatus according to claim 10, wherein the second electronic circuit board includes a wireless communication antenna.

13. The image forming apparatus according to claim 1, further comprising:
- a connector connected to the first electronic circuit board and the second electronic circuit board so that the first electronic circuit board and the second electronic circuit board are electrically connected,
- wherein the connector is connected to the first electronic circuit board at a position below the second electronic circuit board in a vertical direction.

14. The image forming apparatus according to claim 13, wherein the second electronic circuit board includes a battery and a storage.

15. The image forming apparatus according to claim 13, wherein the second electronic circuit board includes a wireless communication antenna.

16. The image forming apparatus according to claim 1, further comprising:
- a back surface member arranged on an apparatus back side; and
- a front surface member including an openable and closable portion, the front surface member being arranged on an apparatus front side opposite to the apparatus back side,
- wherein the input-output terminal is arranged on the apparatus back side, and wherein the first electronic circuit board includes an input-output terminal to which an external device is connectable.

17. The image forming apparatus according to claim 16, wherein the second electronic circuit board includes a battery and a storage.

18. The image forming apparatus according to claim 16, wherein the second electronic circuit board includes a wireless communication antenna.

19. The image forming apparatus according to claim 1, wherein the first electronic circuit board includes an input-output terminal to which an external device is connectable.

20. The image forming apparatus according to claim 1, wherein the supporting member includes the projection projecting and the holding member includes the hole.

21. The image forming apparatus according to claim 1, wherein the holding member is attached to the supporting member toward an attachment direction which is a direction from the first side plate toward the second side plate.

* * * * *